United States Patent [19]

Greppmair

[11] Patent Number: 4,749,049
[45] Date of Patent: Jun. 7, 1988

[54] HAND-GUIDED IMPACT HAMMER AND HAMMER DRILL

[75] Inventor: Martin Greppmair, Munich, Fed. Rep. of Germany

[73] Assignee: Wacker-Werke GmbH & Co. KG, Munich, Fed. Rep. of Germany

[21] Appl. No.: 837,538

[22] Filed: Mar. 7, 1986

Related U.S. Application Data

[63] Continuation of Ser. No. 589,457, Mar. 14, 1984, abandoned.

[30] Foreign Application Priority Data

Apr. 2, 1983 [DE] Fed. Rep. of Germany ....... 3312195

[51] Int. Cl.$^4$ .............................................. E21B 3/00
[52] U.S. Cl. .................... 173/162; 173/162 R
[58] Field of Search ................... 173/162 H; 267/137, 267/141, 141.2

[56] References Cited

U.S. PATENT DOCUMENTS

| | | | |
|---|---|---|---|
| 3,637,029 | 1/1972 | Sherwood, Jr. | 173/162 H |
| 3,972,119 | 8/1976 | Bailey | 267/137 X |
| 4,282,938 | 8/1981 | Minamidate | 173/162 H |
| 4,401,167 | 8/1983 | Sekizawa et al. | 173/162 H |

*Primary Examiner*—E. R. Kazenske
*Assistant Examiner*—Willmon Fridie, Jr.
*Attorney, Agent, or Firm*—Becker & Becker, Inc.

[57] ABSTRACT

A hand-guided impact hammer and hammer drill having a handgrip which is spring-mounted relative to the hammer housing. At the bottom, the handgrip is spring-mounted harder, with greater stability against lateral displacement relative to the hammer housing, than at the top. On the one hand, during normal operation of the hammer, an optimum vibration damping is provided, and on the other hand, even during great pressure on the handgrip, and during lateral twisting of the handgrip, no direct contact can occur between the parts of the handgrip and the parts of the housing. Furthermore, the hammer can be efficiently guided at all times, even with heavy tools.

7 Claims, 2 Drawing Sheets

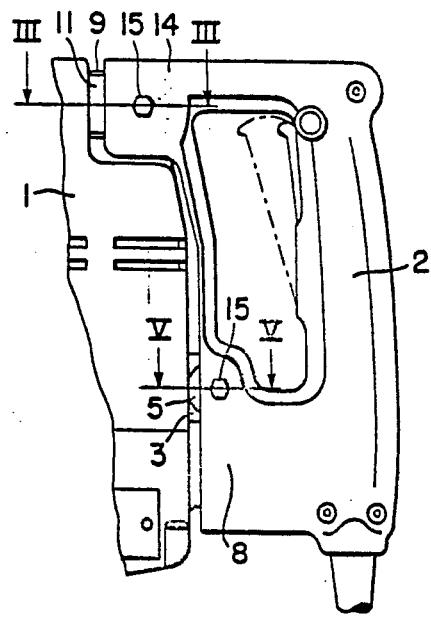
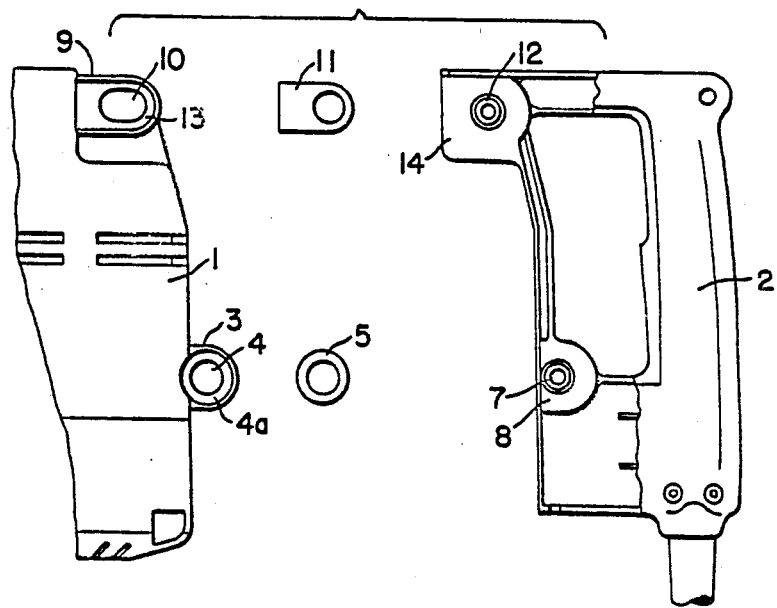

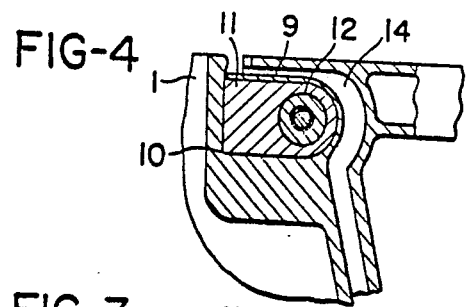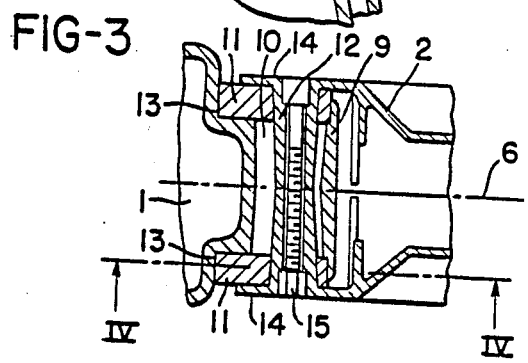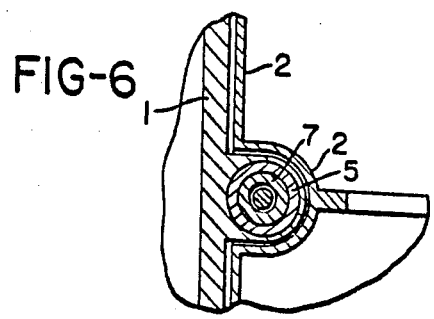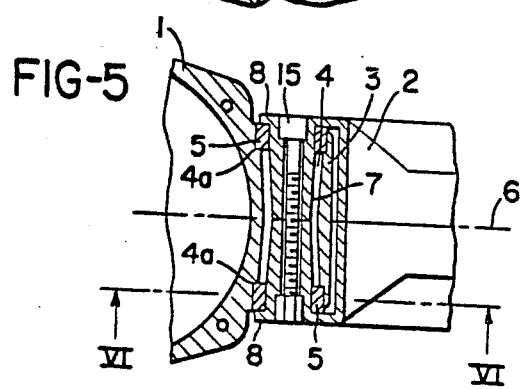

HAND-GUIDED IMPACT HAMMER AND HAMMER DRILL

This is a continuation of co-pending parent application Ser. No. 589,457-Greppmaier filed Mar. 14, 1984, now abandoned.

BACKGROUND OF THE INVENTION

1. Field of the Invention

The present invention relates to a hand-guided impact hammer and hammer drill (percussion drill), the handgrip of which is spring mounted at the top and bottom to the hammer housing.

2. Description of Prior Art

With impact hammers and hammer drills of the aforementioned general type, the purpose of spring-mounting the handle is to keep away from the operator the vibrations which are inherently connected with the operation of such devices, and which are of particular significance with larger machines which have a correspondingly greater power, because in this case the vibrations are not only annoying, but also have a detrimental effect on the joints and the circulation.

Numerous constructions have been proposed for spring-mounting the handle. With all of these constructions, the spring mounting of the upper handgrip is essentially the same, or at least has similar characteristics, as does the bottom spring mounting. For example, German Pat. No. 20 09 537 and German Offenlegungsschrift No. 31 21 882 (based on Japanese disclosure No. 55-99012 and corresponding to U.S. Pat. No. 4,401,167-Sekizawa et al. dated Aug. 30, 1983) disclose such impact hammers and hammer drills. With these heretofore known devices, the precise guideability of the hammer required during operation demands a relatively hard spring-mounting. However, this has associated with it the drawback that the vibration of the hammer housing is insufficiently dampened for the operator. If, on the other hand, the spring-mounting is made relatively soft in order to achieve sufficient damping of the vibrations, this is done at the expense of the precise guideability, and when a lot of pressure is applied to the handle, the spring-mounting can give or deflect to such an extent that parts of the handle contact the hammer housing and generate jarring blows. The same conditions occur when a softly spring-mounted handle is pressed to the side, which occurs rather frequently when such devices are used.

An object of the present invention is to design impact hammers and hammer drills of the aforementioned general type in such a way that on the one hand, during normal operation, an optimum damping of vibrations is achieved, in other words, the acceleration from the housing to the operator is considerably reduced, and on the other hand, even during great pressure upon the handle, and during lateral twisting of the handle, no direct contact can occur between parts of the handle and parts of the housing; and, moreover, that at all times the hammer can be efficiently guided, even when larger work tools are used, such as drill bits, spade tools, etc.

BRIEF DESCRIPTION OF THE DRAWINGS

This object, and other objects and advantages of the present invention, will appear more clearly from the following specification in conjunction with the accompanying drawings, in which:

FIG. 1 is a side view of the back portion of one embodiment of a hammer provided with the inventively spring-mounted handgrip;

FIG. 2 is an exploded view of the hammer of FIG. 1 with the handgrip detached from the hammer housing to illustrate the spring elements, whereby the handgrip is shown in a longitudinal view, parallel to the plane of the drawing, on that side which faces the hammer housing;

FIG. 3 is a cross-sectional view of the upper connection between the hammer housing and the handgrip and is taken along the line III—III in FIG. 1;

FIG. 4 is a longitudinal section of the upper connection between the hammer housing and the handgrip and is taken along the line IV—IV in FIG. 3;

FIG. 5 is a cross-sectional view of the lower connection between the hammer housing and the handgrip and is taken along the line V—V in FIG. 1; and FIG. 6 is a longitudinal section of the lower connection between the hammer housing and the handgrip and is taken along the line VI—VI in FIG. 5.

SUMMARY OF THE INVENTION

The hand-guided impact hammer and hammer drill of the present invention is characterized primarily in that at the bottom, the handgrip is spring-mounted harder, with greater stability against lateral displacement relative to the hammer housing, then at the top.

With the inventive hammer, the bottom handle spring-mounting is relatively stable, having only a small spring deflection. This allows it to achieve the great lateral stability required for the precise guideability of the hammer. In contrast, the upper spring-mounting is considerably softer, so that the vibrations to a large extent can be absorbed. Underlying the present invention is the recognition of the fact that the contact pressure on the hammer is chiefly applied to the handle in the upper region, so that to dampen the vibrations for the operator, the upper spring-mounting is of primary importance.

Further advantageous features of the present invention for optimizing the desired outcome are as follows.

The upper mounting, starting from the unstressed position of the handgrip, may be spring-mounted harder in the pull direction than in the push direction. This has the effect that if necessary a strong pull also can be exerted without damaging the resilient parts.

The lower mounting of the handgrip essentially can be designed as a swivel joint having an axis of rotation which is approximately perpendicular to the central plane of the handgrip, and having approximately the same spring capacity radial to the axis of rotation in all directions. This results in a simple to realize construction having high functionability and long service life for the lower spring-mounting.

As a further development of the last mentioned construction, and to achieve a particularly great lateral stability of the bottom spring-mounting, the radially springing swivel joint may be formed by two damping rings of resilient material; the rings are coaxial to the axis of rotation, and are spaced from one another. On the one hand, each of the rings snugly encircles an associated, approximately circular attachment or spindle on the handgrip, and on the other hand, each of the rings is inserted with a snug fit into an associated, approximately circular recess or bore of the hammer housing; the end faces of the rings also keep the hammer housing and the handgrip at a distance from one another in the lateral direction.

The upper mounting may be formed by two damping elements of resilient material which are spaced from one another and are disposed along an axis which is at right angles to the central plane of the handgrip. On the one hand, each of these damping elements snugly encircles an associated attachment or spindle on the handgrip which is disposed approximately at the level of this axis, and on the other hand, each of these elements is inserted with a snug fit into an associated recess or bore of the hammer housing. The end faces of the damping elements also keep the hammer housing and the handgrip apart in the lateral direction, whereby the dimensions of the damping elements from the attachment on the handgrip inwardly in the push direction toward the hammer housing is considerably greater than the dimension from this attachment outwardly in the pull direction. This particular construction of the upper spring-mounting is characterized in that the spring-mounting in the neutral position of the handgrip is very soft and produces a particularly high damping at zero or only slight engagement pressure, whereas when the pressure increases, the counter force progressively increases and reliably eliminates the condition where the handgrip can come into direct contact with the hammer housing. Furthermore, this structural configuration of the upper spring-mounting is also simple and easy to realize, and assures a long service life.

The spring mounting between the hammer housing and the handgrip is preferably accomplished by means of a resilient material in the form of an elastomer having cellular structure, for example, resiliently foamed polyurethane.

DESCRIPTION OF PREFERRED EMBODIMENTS

Referring now to the drawings in detail, the hammer portion illustrated therein comprises a hammer housing 1, with only that portion thereof being illustrated which is necessary for describing the present invention, namely that portion which adjoins the handgrip, which is designated in general with the reference numeral 2.

For the lower spring-mounted connection between the housing 1 and the handgrip 2, a projection 3, which extends at right angles to the central longitudinal plane, i.e. right angles to the plane of the drawings of FIGS. 1, 2, and 6, is provided on the housing 1. The projection 3 is provided with a continuous bore 4, the outer ends of which are widened to form respective shoulders 4a. Rings 5 made of a resilient material, for example, the materials known by the Trademarks Cellasto and Vulkocell, are inserted in the widened end portions of the bore 4. These rings 5 have a length which is greater than the depth of the widened end portions of the bore, so that when the rings are inserted up to the shoulders 4a, they project slightly beyond the bore 4 at the two ends thereof.

The handgrip 2 can be divided in the middle along the dot-dash line 6 (FIGS. 3 and 5), and is provided in the region of the lower connection, between the handgrip 2 and the housing 1, with a spindle 7 which extends between outer engagement flanges 8 at right angles to the central plane of the hammer. The spindle 7 extends from the outer end face of one of the rings 5 to the outer end face of the other ring 5. In the free and unstressed state of the rings 5, when they are placed in the end portions of the bore 4, the length of the spindle 7 can be slightly less than the length between the aforementioned end faces of the rings 5, so that the latter are somewhat compressed when the split handgrip 2 is placed on the housing 1 and the two parts of the spindle 7 are inserted into the bore 4 and are interlocked. When the handgrip 2 is interlocked, the entire region of the spindle 7 which is disposed in the rings 5 has approximately the same, and preferably a slightly greater, diameter than do the respective rings on the inside in the unstressed state, so that also in this case, as with the aforementioned situation, a certain compression of the material results. The compression of material during assembly, and the properties of the material, are selected in such a way that a relatively great hardness results for the spring-mounting which is achieved between the rings 5 in the bore 4 and on the spindle 7; in particular, the projection of the rings 5 out of the bore 4 must not be overcome during severe use of the hammer, so that the handgrip and the hammer housing never come into direct contact with one another.

In the illustrated embodiment, the lower connection between the housing 1 and the handgrip 2 forms a spring-mounted swivel joint having great lateral stability achieved due to the relatively large spacing between the rings 5, and due to the appropriate length of the spindle 7.

With regard to the handgrip 2, the upper connection between the handgrip 2 and the housing 1 is practically the same as the lower connection, and with regard to the housing 1, the upper connection is similar to the lower connection. The difference with regard to the hammer housing is that the upper projection 9, which also has a continuous bore 10 which extends at right angles to the central plane of the housing, is not provided at the end portions of the bore 10 with a circular widened portion all around as was the case with the lower connection, but rather is only widened in a circular manner over that half which faces the handgrip, with the half which faces the housing, when viewed at right angles to the central plane of the housing, being widened in the manner of a square or rectangle in order to be able to receive respective, correspondingly shaped damping elements 11 of resilient material, for example Cellasto or Vulkocell, in other words, foamed polyurethane. In the direction of the spindle 12 of the handgrip, which corresponds to the spindle 7, the damping elements 11 also have such a dimension or thickness that they project outwardly beyond the bore 10 when the are inserted into the widened end portions of the bore 10 up to the shoulder 13.

When the handgrip 2 is assembled, the upper flanges 14 thereof rest against the outside of the respective damping elements 11 which, because they project out of the bore 10, always keep the flanges 14 away from the housing 1, even when the drill is being severely used.

When the handgrip 2 is attached, the damping elements 11, through which the spindle 12 passes in the vicinity of a circular bore, also can have a certain compression which, in conjunction with the properties of the material, provides the desired spring hardness which, however, at least in the direction toward the housing 1, is considerably less at the top than is the lower spring-mounting. This results due to the fact that the distance of the spring elements 11 from the spindle 12 to the housing 1 is greater than the distance in the opposite direction to the handgrip. In the direction toward the handgrip, i.e. in the pull direction, less material is available for compression of the elements 11, so that in this direction large pulling forces can be exerted with little spring deflection of the upper spring-mounting in order, for example, to loosen a stuck tool. In the opposite direction, i.e. in the push direction, considerably more material is present which accordingly permits softer deflection, with greater spring deflection, even from the neutral position of the handgrip. As the pressure increases, the counter pressure also progressively increases as the distance between the spindle 12 and the housing 1 becomes smaller; however, in each case the spindle 7, or the extending flanges, are prevented from engaging the housing 1, because prior to such a state being reached, the material is compressed to such an extent that the force which an operator can exert is normally insufficient to accomplish this. Furthermore, the top of the flanges 14, in the direction toward the housing 1, even extend beyond the narrow part of the bore 10, in other words, an overlap exists between these flanges and the shoulders 13 in the bore 10 on the side of the housing. Without destroying the resilient elements 11, this overlap does not permit direct contact between the hand grip and the housing from the side.

Despite the high functionability, the construction with regard to the arrangement on the housing and on the handgrip, and also with regard to the shape of the resilient elements, is quite simple and assures a long service life.

Just as simple as the construction itself, is the assembly, with the parts being held in place by draw-in bolts 15 which pass through these spindles 7 and 12 (FIGS. 1, 3, and 5).

The present invention is, of course, in no way restricted to the specific disclosure of the specification and drawings, but also encompasses any modifications within the scope of the appended claims.

What I claim is:

1. On a hand-guided impact hammer and hammer drill including a hammer housing and having an improvement in combination therewith which comprises:
   a single handgrip including two fastening locations at top and bottom thereon bridged by the handgrip as held upright as well as including two fastening locations on said hammer housing correspondingly in cooperation with the two fastening locations of said handgrip respectively, said fastening locations respectively being vertically one above the other and having a front pushing direction as well as a rearward pulling direction as located along a side of said hammer housing; and
   an upper softer non-swivel spring-mounting located to position said single handgrip spring-mounted to said hammer housing at a top location as well as also a lower harder and structurally different swivel spring-mounting located to position said single handgrip spring-mounted to said hammer housing at a bottom location, with said lower spring-mounting at said bottom location being harder, with greater lateral stability against lateral displacement of said single handgrip relative to said hammer housing, than that of said upper softer non-swivel spring-mounting at said top location which is elastically more resilient particularly in the forward-pushing direction although experiencing stable resilient resistance toward the rear, such that in the forward-pushing direction shocks and impacts will be encountered by the hand-guided impact hammer and hammer drill as accomplished via differing hardness of said upper spring-mounting and said lower spring-mounting differentiated from each other as arranged for a predetermined special greater lateral stability against lateral displacement of said single handgrip relative to said hammer housing.

2. A hand-guided hammer in combination according to claim 1, in which said upper spring-mounting at said top location, starting from an unstressed position of said handgrip, is greater in hardness in the pull direction than in the push direction.

3. A hand-guided hammer in combination according to claim 1, in which said lower spring-mounting at said bottom location is essentially a swivel joint structure having an axis of rotation which is approximately perpendicular to a central plane of said handgrip, and which has approximately the same spring capacity in all directions radial to said axis of rotation.

4. A hand-guided hammer in combination according to claim 3, in which said swivel joint structure comprises:
   a first attachment, on said handgrip, of approximately circular cross section;
   a first projection, on said hammer housing, having a recess of approximately circular cross section; and
   two spaced-apart damping rings of resilient material, said damping rings being coaxial with said axis of rotation; each of said damping rings snugly encircles said first attachment on said handgrip, and snugly fits in said recess of said first projection; said damping rings being provided with end faces which also keep said hammer housing and said handgrip from contacting one another in the lateral direction.

5. A hand-guided hammer in combination according to claim 4, in which said upper spring-mounting at said top location comprises:
   a second attachment, on said handgrip, disposed along an axis which is approximately perpendicular to a central plane of said handgrip;
   a second projection, on said hammer housing, having a recess; and
   two spaced-apart damping elements of resilient material disposed at approximately the level of said axis of said second attachment; each of said damping elements snugly encircles said second attachment on said handgrip, and snugly fits in said recess of said second projection; said damping elements being provided with end faces which also keep said hammer housing and said handgrip from contacting one antoher in the lateral direction, whereby the dimension of said damping elements as measured from said second attachment on said handgrip inwardly in the push direction towards said housing is considerably greater than the dimension of said damping elements as measured from said second attachment outwardly in the pull direction away from said housing.

6. A hand-guided hammer in combination according to claim 5, in which said resilient material of said damping rings and of said damping elements is an elastomer which has a cellular structure.

7. A hand-guided hammer in combination according to claim 6, in which said elastomer is a resilient polyurethane foam.

* * * * *